(12) United States Patent
Taneja et al.

(10) Patent No.: US 9,760,672 B1
(45) Date of Patent: Sep. 12, 2017

(54) CIRCUITRY AND METHOD FOR CRITICAL PATH TIMING SPECULATION TO ENABLE PROCESS VARIATION COMPENSATION VIA VOLTAGE SCALING

(71) Applicant: QUALCOMM INCORPORATED, San Diego, CA (US)

(72) Inventors: Sanjiv Taneja, Cupertino, CA (US); Bradley Quinton, Vancouver (CA); Trent McClements, Burnaby (CA); Andrew Hughes, Vancouver (CA); Sheida Alan, Burnaby (CA); Bozena Kaminska, Vancouver (CA)

(73) Assignee: QUALCOMM Incorporated, San Diego, CA (US)

( * ) Notice: Subject to any disclaimer, the term of this patent is extended or adjusted under 35 U.S.C. 154(b) by 155 days.

(21) Appl. No.: 14/791,430

(22) Filed: Jul. 4, 2015

Related U.S. Application Data

(60) Provisional application No. 62/095,072, filed on Dec. 22, 2014, provisional application No. 62/146,412, filed on Apr. 13, 2015, provisional application No. 62/146,419, filed on Apr. 13, 2015.

(51) Int. Cl.
*G06F 17/50* (2006.01)

(52) U.S. Cl.
CPC ...... *G06F 17/5081* (2013.01); *G06F 17/5072* (2013.01)

(58) Field of Classification Search
CPC ..................................................... G06F 17/50
See application file for complete search history.

(56) References Cited

U.S. PATENT DOCUMENTS

| | | |
|---|---|---|
| 6,868,503 B1 | 3/2005 | Maksimovic et al. |
| 7,418,368 B2 | 8/2008 | Kim et al. |
| 7,979,225 B2 | 7/2011 | Muller et al. |
| 8,497,694 B2 | 7/2013 | Chua-Eoan et al. |
| 8,745,561 B1 | 6/2014 | Garg et al. |
| 8,769,470 B2 | 7/2014 | Dai et al. |
| 8,860,502 B2 | 10/2014 | Gemmeke et al. |
| 9,536,038 B1 | 1/2017 | Quinton et al. |
| 9,564,883 B1 | 2/2017 | Quinton et al. |
| 9,564,884 B1 | 2/2017 | Quinton et al. |

(Continued)

OTHER PUBLICATIONS

Meijer M., et.al., "On-Chip Digital Power Supply Control for System-on-Chip Applications", In Proceeding of International Symposium on Low Power Electronics and Design (ISLPED), Nov. 2005, pp. 311-314.

*Primary Examiner* — Thuan Do
(74) *Attorney, Agent, or Firm* — Smith Tempel Blaha LLC

(57) ABSTRACT

A critical-path timing sensor detects set-up timing failures from a functional critical path to a path flip-flop. The functional critical path carries test data during test mode, and normal data during normal device operation. The path flip-flop's D input and Q output are compared by an exclusive-OR (XOR) gate and sampled by an early capture flip-flop that is clocked by a delayed clock, sampling D and Q just after the path flip-flop is clocked. When set-up time fails, D and Q differ just after the clock edge and a timing failure is latched. Timing failures activate a controller to increase VDD, while VDD is reduced in the absence of timing failures. Process variations are accounted for, allowing for lower power or faster operation. A margin delay between the functional critical path end and the early capture flip-flop detects timing failures before they occur in the path flip-flop.

18 Claims, 14 Drawing Sheets

(56) References Cited

U.S. PATENT DOCUMENTS

2006/0259840 A1 11/2006 Abadeer et al.
2009/0031268 A1 1/2009 Miranda et al.
2011/0055781 A1 3/2011 Potkonjak

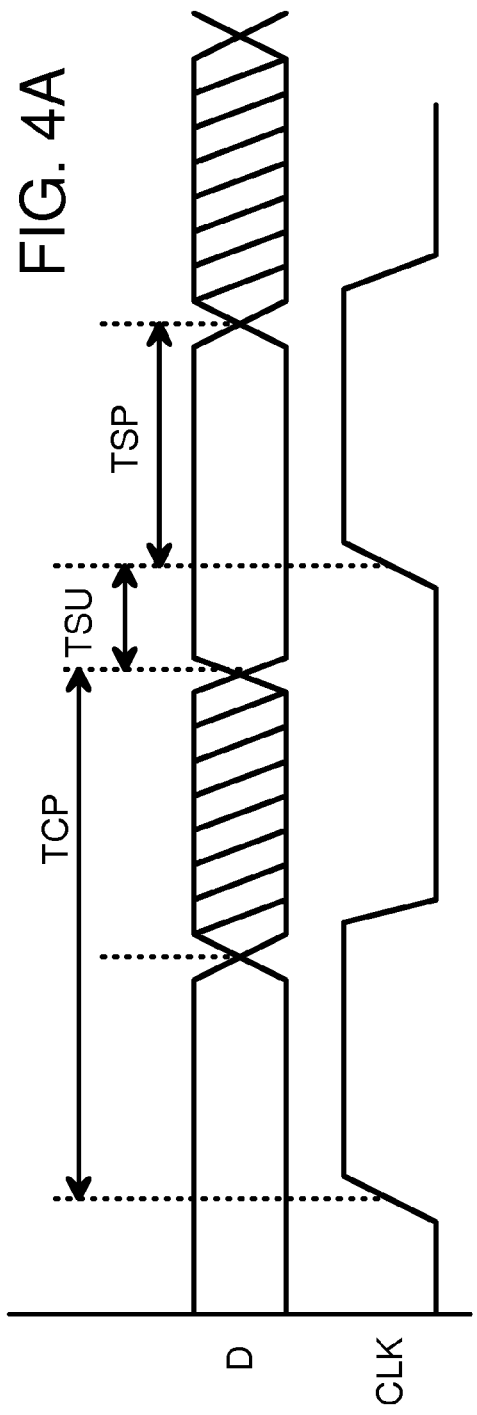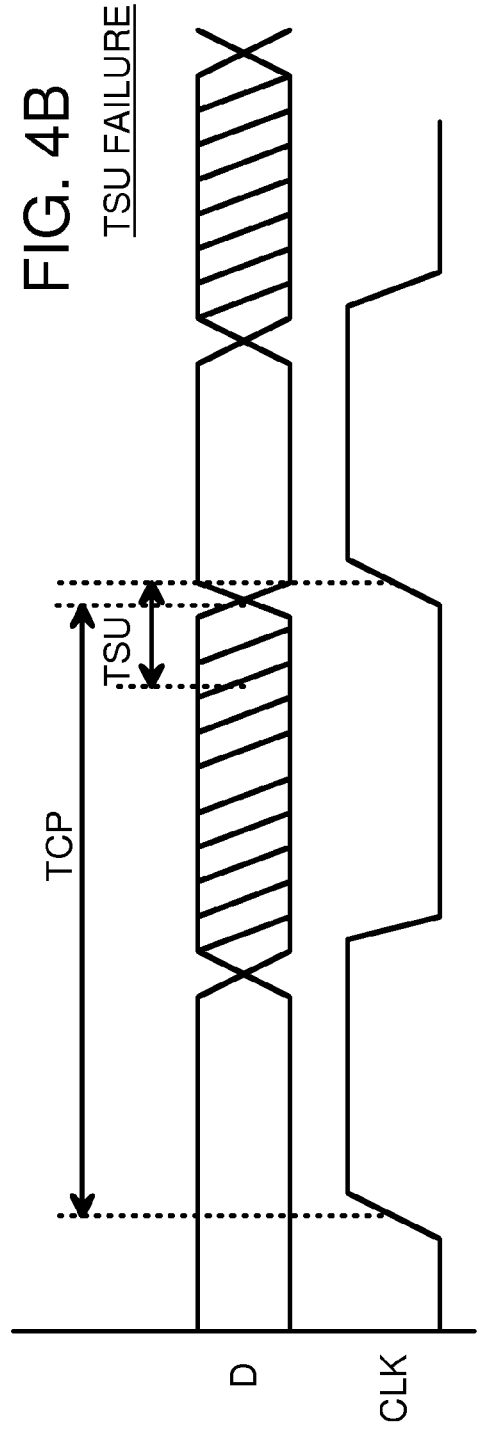

CIRCUITRY AND METHOD FOR CRITICAL PATH TIMING SPECULATION TO ENABLE PROCESS VARIATION COMPENSATION VIA VOLTAGE SCALING

RELATED APPLICATION

This application is a non-provisional of the co-pending provisional application for "Circuitry and Method for Critical Path Timing Speculation to Enable Process Variation Compensation Via Voltage Scaling", U.S. Ser. No. 62/095,072, filed Dec. 22, 2014, and "Circuitry and Method for Critical Path Timing Speculation using Edge Sensitive Sampling". U.S. Ser. No. 62/146,412, filed Apr. 13, 2015, and "Circuitry and Method for Critical Path Timing Speculation Via Transition Detection Using Synchronous Logic", U.S. Ser. No. 62/146,419, filed Apr. 13, 2015.

FIELD OF THE INVENTION

This invention relates to on-chip timing sensors, and more particularly to critical path delay sensors that use actual functional critical paths in a chip.

BACKGROUND OF THE INVENTION

Semiconductor devices are specified (spec'ed) to operate within certain parameters, such as a maximum power draw and a maximum clock frequency. While semiconductor manufacturing processes are very precise, process variations do occur. Although the manufacturing process may target a typical device, sometimes process variations produce slower chips or faster chips. As device sizes shrink, larger relative variations may occur.

Chips may be tested to determine their power draw and speed, and these chips may be sorted into slow-chip bins, fast-chip bins, and typical-chip bins. The faster chips may be sold as faster speed grades, while the slower chips may be sold for slower speed grades. Unfortunately, such process skews are not always reproducible or planned but may occur randomly, making for logistical difficulties. Therefore all process skews are often lumped together. The slowest expected process skews determine the specified speed of the device, while the fastest expected process skews determine the specified maximum power dissipation.

FIG. 1 is a graph showing how process variations affect device specifications. The slowest process skew (SS) has the lowest power and the lowest performance or speed. A typical process (TT) has a better power and performance product. The fastest process skew (FF) has the highest performance and speed, but also consumes the most power.

All three process skews—slow, typical, and fast, share the same device specifications when no grade sorting is performed. Devices produced with the slowest process determine the speed specs such as the maximum clock frequency, or the minimum clock-to-output delay times. However, the fast devices consume more power than do the slower devices, so power specs are determined by devices manufactured by the fast process skews. The power-supply voltage VDD is usually fixed.

The performance and power specs are determined by the worst-case devices over the expected process skews. Slow devices set the speed specs and fast devices set the power specs. This is not optimal, since fast devices are spec'ed slower than they can actually operate, and slow devices actually draw less power than spec'ed.

Specialized sensors may be added to chips to facilitate at-speed testing. Dummy bit lines have been added to RAM arrays to adjust bit-line sensing circuits. An oscillator or a canary circuit may be added to track process variations. However, the actual circuit may be much more complex than an oscillator, resulting in tracking errors. For logic chips, a dummy path and an on-chip timing sensor may be added. The timing sensor can report its results to a tester or even to an on-chip controller that can adjust operating conditions, such as to slow down or stop a clock to reduce power consumption.

The actual critical paths in a logic circuit are the first to fail as the applied clock speed is increased. The actual critical path will have different characteristics than a dummy load to a sensor. Cross talk from neighboring nodes will differ even if gates, capacitances, and wiring traces are exactly mimicked. Extensive corner analysis may be needed to set sufficiently large margins to account for the differences between dummy paths and actual critical paths.

While such on-chip dummy paths and sensors are useful, it is desired to measure the actual critical paths rather than measure a dummy path. It is desired to add a timing sensor to an actual critical path on a chip so that the timing sensor is measuring the delay of the same physical path that carries functional data during operation of the chip.

What is desired is a critical-path timing sensor that measures delays on the same physical components that are used in functional critical paths on a chip. It is desirable to use the same gates, wires, and loads of a functional critical path. During a test mode the critical path is exercised by a test pattern to measure the timing delays of the actual functional critical path. During normal modes of operation, the functional critical path carries normal data or signals in the chip.

BRIEF DESCRIPTION OF THE DRAWINGS

FIGS. 4A-B are timing diagrams showing critical-path timing success and failure.

DETAILED DESCRIPTION

The present invention relates to an improvement in timing sensors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors realize that test data patterns can be applied to actual functional critical paths during a test mode, allowing the functional critical paths to return to carrying normal data when test mode is completed. The actual functional critical paths are measured rather than a dummy path. Tracking errors are eliminated. The sensor results may be used to speed up or slow down the chip by adjusting power-supply voltage VDD. Process skews cause timing variations in the functional critical paths which are measured by the sensors and then compensated for by adjusting VDD.

Figure 2:
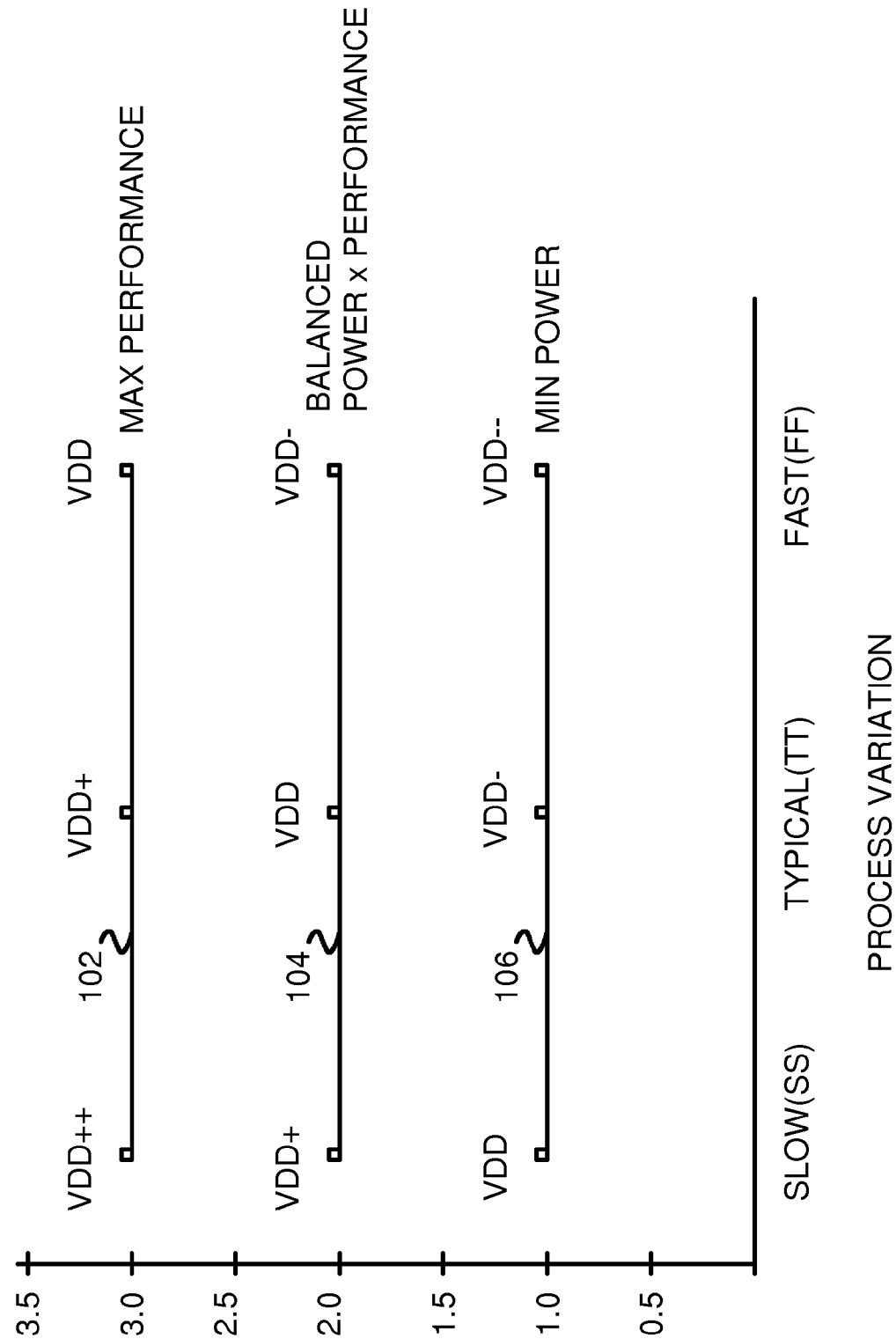
FIG. 2 is a graph showing adjusting VDD to compensate for process skews.

FIG. 2 is a graph showing adjusting VDD to compensate for process skews. On-chip sensors accurately measure timing delays in functional critical paths. Since the actual critical-path delays are precisely measured, less of a guard band is needed in the chip specifications. Process skews are accurately accounted for, so either the performance or the power spec may be increased.

When performance is maximized, curve 102 shows that the fast process skew chips are powered by VDD and determine the performance specs. The internal power supply to the typical chip is increased to VDD+ to increase its performance to match the performance of the fast-process chip. The internal power supply to the slow-process chip is increased further to VDD++ so the slow-process chip can also meet the timing spec of the fast-process chip. Since the maximum power consumption spec is determined by the fast-process chip operating at VDD (See FIG. 1), the typical and slow chips will consume less than the spec'ed power when powered at VDD. The amount of increase in VDD to VDD+ and VDD++ can be chosen so that the maximum power spec is not exceeded. Thus the slow and typical chips still consume less than the spec'ed power but also have increased performance using curve 102.

Figure 1:
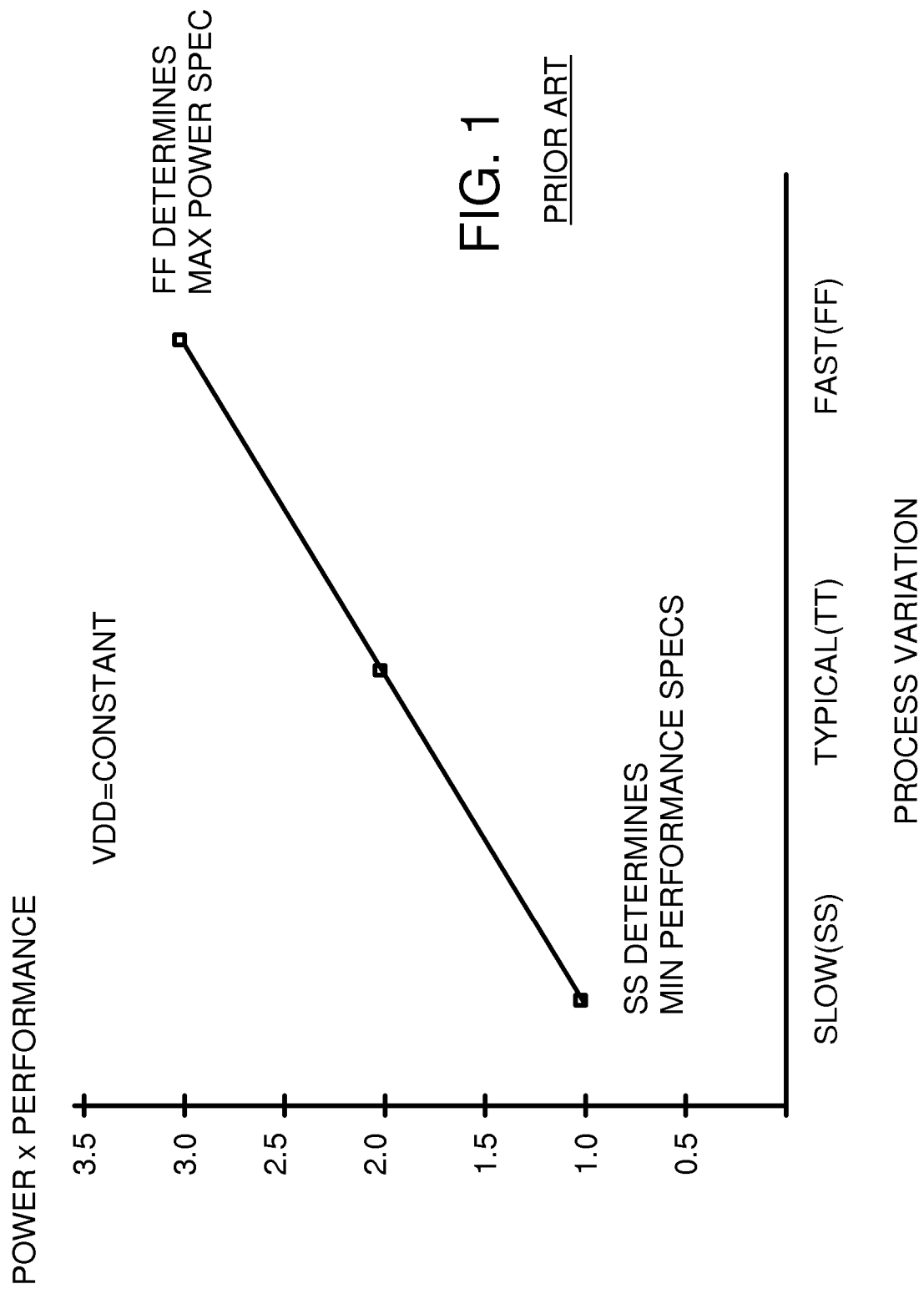
FIG. 1 is a graph showing how process variations affect device specifications.

When reducing power is more important that increasing performance, such as for battery-powered applications, curve 106 is used. The slow-process chip is powered by VDD and sets the performance specs (FIG. 1). However, since the typical and fast-process chips are inherently faster at the same nominal VDD, their internal power supplies are decreased to VDD− and VDD−− so that the same performance spec is reached but power consumption is reduced.

Curve 104 shows a balanced approach. When the internal critical-path sensors determine that the chip was made using a typical process, this typical-process chip is powered with the nominal VDD. Power is less than the maximum spec'ed by the fast-process chips and performance is better than the minimum spec'ed by the slow-process chips.

When the critical-path timing sensors determine that the chip is a fast-process chip, the internal VDD is reduced to VDD−. This reduces power consumption while maintaining performance. When the critical-path timing sensors determine that the chip is a slow-process chip, the internal VDD is raised to VDD+. This increases performance while maintaining power consumption.

Thus by measuring the timing of actual critical paths, the internal power supply to internal circuits is adjusted up or down to compensate for process skews. The chip may operate at higher performance or power may be saved. Thus chip operation is optimized for the process skew that the chip was manufactured with.

Figure 3:
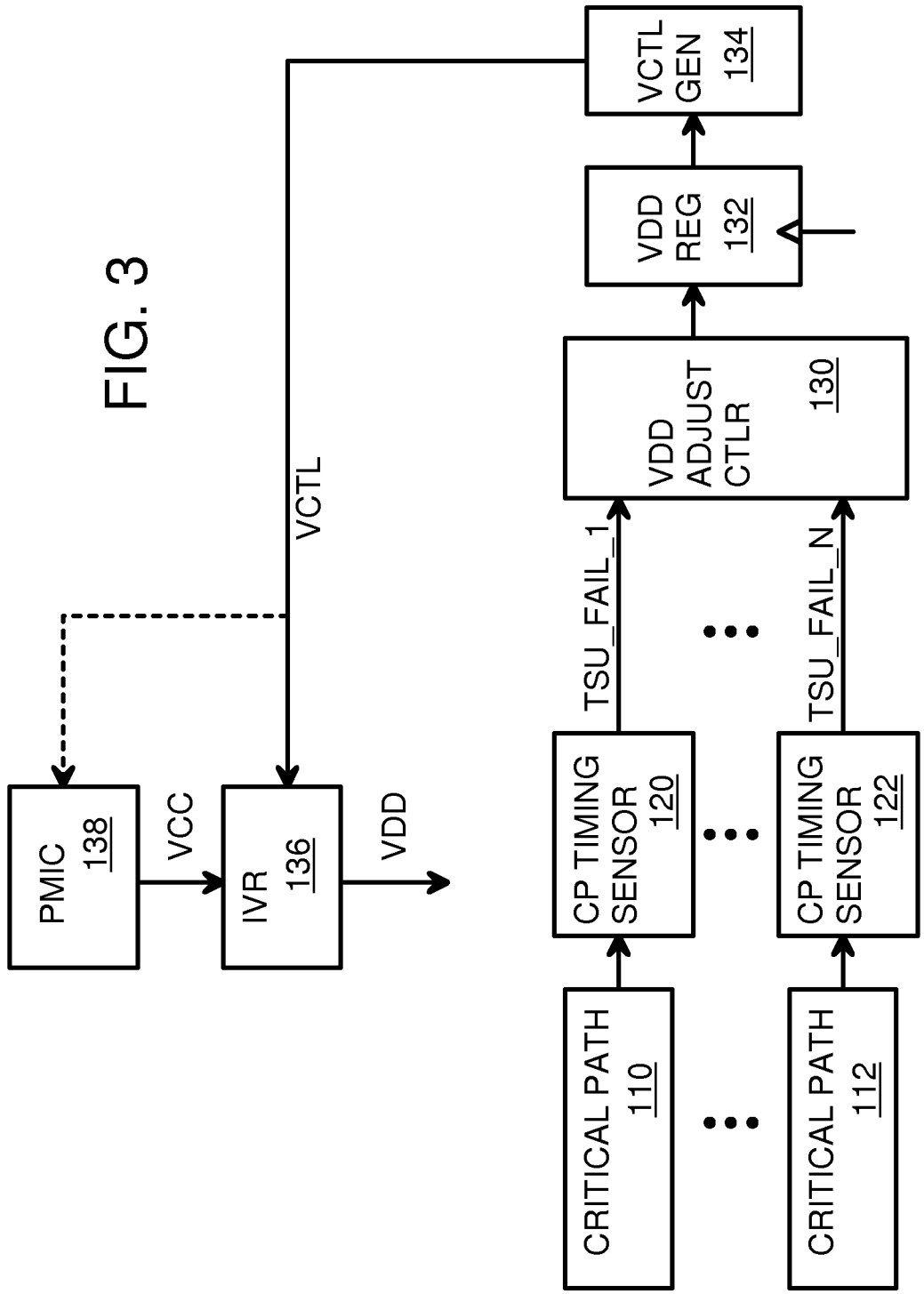
FIG. 3 is a block diagram with a controller that adjusts the internal power supply in response to critical path timing measurements.

FIG. 3 is a block diagram with a controller that adjusts the internal power supply in response to critical path timing measurements. Power Management Integrated Circuit (PMIC) 138 is an external IC that generates a VCC power supply applied to a chip. Integrated Voltage Regulator (IVR) 136 receives VCC on an external pin and generates a regulated internal power supply voltage VDD. IVR 136 could be a Low-Drop Out (LDO) regulator or a Switching Mode Power Supply (SMPS) regulator that are on the substrate with critical paths 110, 112 and supply VDD to all internal components within the same voltage domain.

Critical path 110 is an actual functional critical path, such as a chain of logic gates between two flip-flops within a logic block powered by VDD. During a test mode, test data is scanned into a chain of the flip-flops. Then the flip-flops are clocked, causing the test data to pass through critical paths 110, 112 to critical path timing sensors 120, 122. Critical path timing sensors 120, 122 determine when the test data did not meet the set-up timing requirement to the next flip-flop, and then activate timing failure signals TSU_FAIL_1, TSU_FAIL_2, . . . TSU_FAIL_N to controller 130.

Controller 130 receives the timing failure signals from critical path timing sensors 120, 122 and signals adjustments for VDD. When one or more valid timing failure signals are received, controller 130 increases VDD by some increment by writing a larger value into VDD register 132. When no timing failure signals are received, controller 130 may decrease VDD by writing a smaller value to VDD register 132. Controller 130 may use various routines and procedures to test out different VDD voltages and then to back away from a level of VDD that causes failures to provide some guard band.

The digital value in VDD register 132 is converted to an analog voltage by VCTL control voltage generator 134. This control voltage VCTL is applied to an analog control voltage input to either internal IVR 136 or to external PMIC 138. Control voltage VCTL causes IVR 136 or PMIC 138 to adjust the VDD or VCC generated. Thus controller 130 adjusts VDD in response to timing failure signals from critical path timing sensors 120, 122. The adjusted VDD is applied to all components in the voltage domain, such as functional critical paths 110, 112, critical path timing sensors 120, controller 130, VDD register 132, and VCTL control voltage generator 134.

FIGS. 4A-B are timing diagrams showing critical-path timing failure. In FIG. 4A, the D input to a D-type flip-flop receives a signal generated by functional critical path 110 of FIG. 3. The flip-flops are clocked by the rising edge of clock CLK. When CLK rises, data from the outputs of upstream flip-flops travel through various paths to the inputs of the next logical level of flip-flops. The changing signals must propagate through the various paths and arrive at the D inputs of the next level of flip-flops at least a set-up time TSU before the next rising edge of CLK. The slowest path is the critical path that has a delay of TCP.

Several other paths may converge with this critical path. The fastest of these converging paths has a shortest path delay of TSP. After each rising clock edge of CLK, the D input to the next level of flip-flop can begin to change TSP after the CLK edge, and may continue to change until TCP. In FIG. 4A, TCP occurs just before the required TSU, so timing does not fail. The correct data is clocked into the next-level flip-flop.

In FIG. 4B, a timing failure occurs. The clock may be running at a higher frequency in FIG. 4B than in FIG. 4A, a lower VDD, a higher temperature, a slower-process chip may be shown, or the chip may have aged or otherwise degraded.

The critical path delay TCP is larger relative to the clock period so that the D input is still changing after TSU. The correct data through the critical path does not arrive at D until after TSU, so the wrong data may get clocked into the next-level flip-flop. A set-up timing error occurs.

Figure 5:
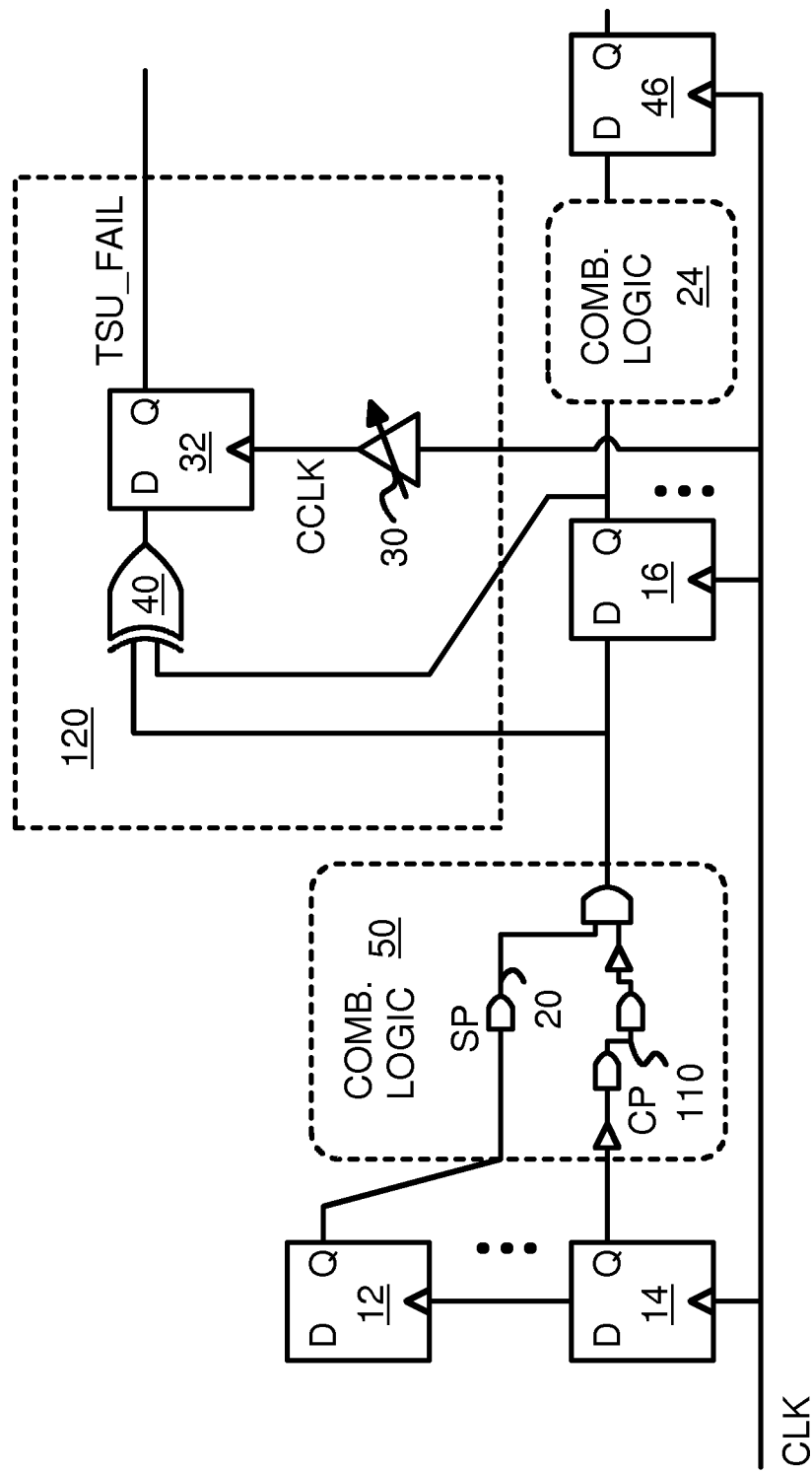
FIG. 5 is a schematic of a functional critical path and a critical path sensor.

FIG. 5 is a schematic of a functional critical path and a CP sensor. Flip-flops 12, 14, 16, 46 are clocked by CLK and may have data scanned into them during a test mode, such as by using Level-Sensitive Scan Design (LSSD) and similar techniques. Combinatorial logic 50 includes logic gates between first-level flip-flops 12, 14 and next-level flip-flop 16. When the rising edge of CLK occurs, the Q outputs of first-level flip-flops 12, 14 change, and this change propagates through functional critical path 110 and short path 20 within combinatorial logic 50 to the D input of next-level flip-flop 16.

When the set-up time to next-level flip-flop 16 is met, the correct data is clocked into next-level flip-flop 16, and then passes through combinatorial logic 24 to third-level flip-flop 46. An actual circuit has many more flip-flops at each level than shown. During normal operation, data and control signals are clocked through the flip-flops. However, during a test mode the test data is scanned into the flip-flops, which may include muxes on their D inputs and/or a separate test clock.

Once the desired test data is clocked into the flip-flops, CLK is pulsed, allowing the test data from first-level flip-flops 12, 14 to flow through functional critical path 110 and short path 20 to the D input of next-level flip-flop 16. When the set-up timing requirement is met, the correct data is clocked into next-level flip-flop 16 and appears at the Q output. For a short time after the rising edge of CLK, the D and Q terminals of next-level flip-flop 16 will be identical. However, if the set-up timing failed, the wrong data is clocked into next-level flip-flop 16, at the D and Q terminals likely have different data.

XOR gate 40 compares the D and Q terminals of next-level flip-flop 16 and signals a timing failure when D and Q are different. Capture flip-flop 32 is clocked by a delayed capture clock CCLK, which is delayed slightly from CLK by delay buffer 30. Thus capture flip-flop 32 samples the output of XOR gate 40 after a delay set by delay buffer 30. When the D and Q terminals of next-level flip-flop 16 are not in the same state just after next-level flip-flop 16 is clocked, a failure is detected by XOR gate 40 and captured by capture flip-flop 32 to generate the set-up timing failure signals TSU_FAIL.

XOR gate 40, capture flip-flop 32, and delay buffer 30 form Critical-Path (CP) sensor 120. The delay of delay buffer 30 can be varied for optimal performance, either by hardware design or programmably, such as by controller 130 (FIG. 3).

Figure 6:
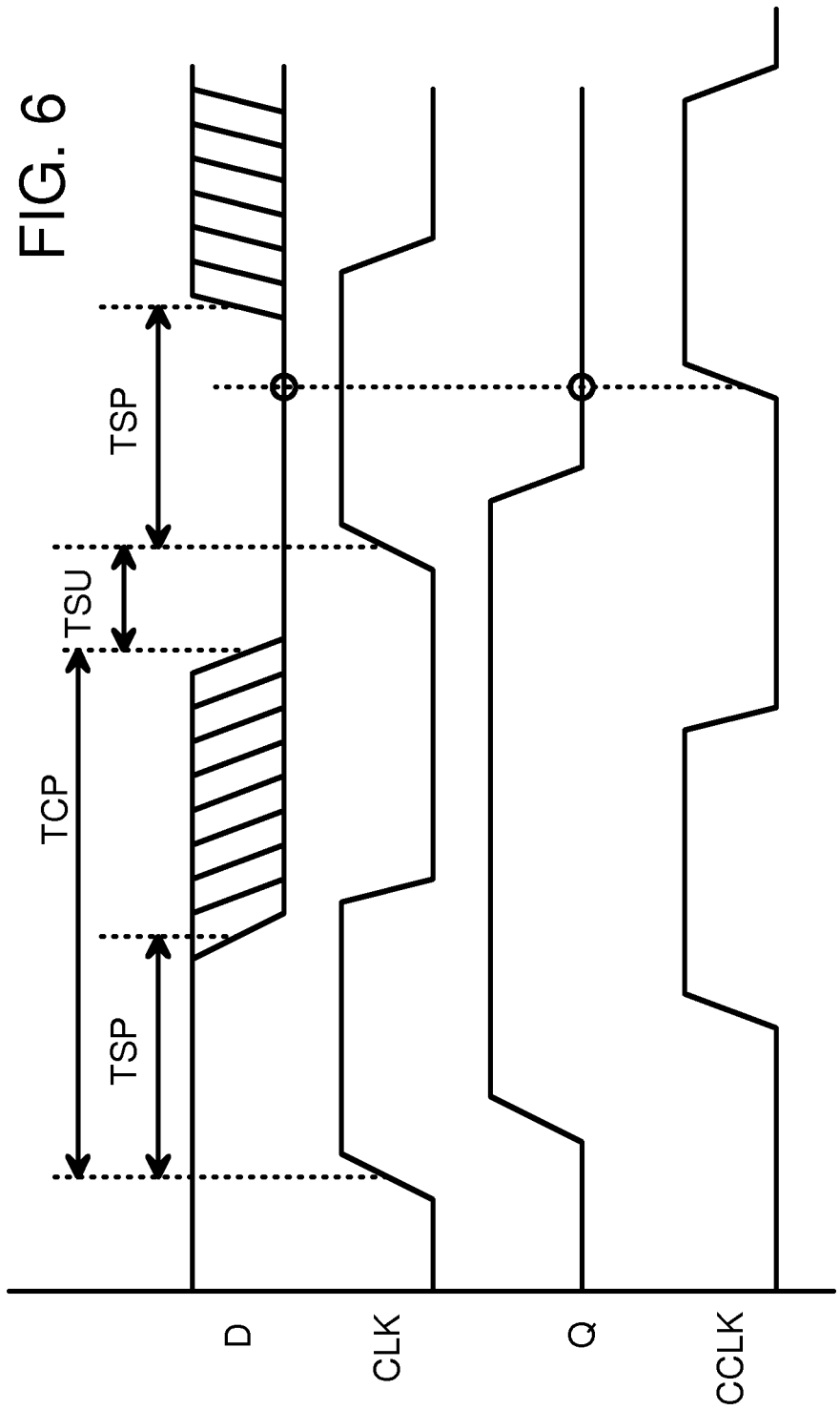
FIG. 6 is a timing diagram showing capture timing for a critical path set-up timing failure.

FIG. 6 is a timing diagram showing capture timing for a critical path set-up timing failure. The Q output of next-level flip-flop 16 changes in response to the rising edge of CLK. When the set-up timing is met, the D input is stable. State changes from upstream flip-flops have had time to propagate through the converging short path (delay TSP) and critical path (delay TCP from the earlier CLK edge).

The D input to next-level flip-flop 16 will not be able to change until TSP after the next CLK edge, since state changes require TSP of time to propagate through the converging short path. Thus D is guaranteed to not change until TSP after the CLK edge. During this time window from CLK rising until TSP, the D and Q terminals of next-level flip-flop 16 are sampled by XOR gate 40, as shown by the circles. The rising edge of capture clock CCLK is delayed so that D and Q are sampled within this window, before TSU.

As TCP is increased, eventually TCP occurs after TSU, and a timing failure starts to occur. Then the new data does not get clocked into next-level flip-flop 16, and Q does not change. D and Q would then have different values when CCLK occurs.

If TCP were to be increased by a large amount, then CCLK could occur before TCP, and the failure would not be captured. This problem can be avoided by increasing TCP by small increments rather than by large jumps. Controller 130 adjusts VDD by small amounts so that TCP does not increase beyond the capture window of CCLK.

Figure 14:
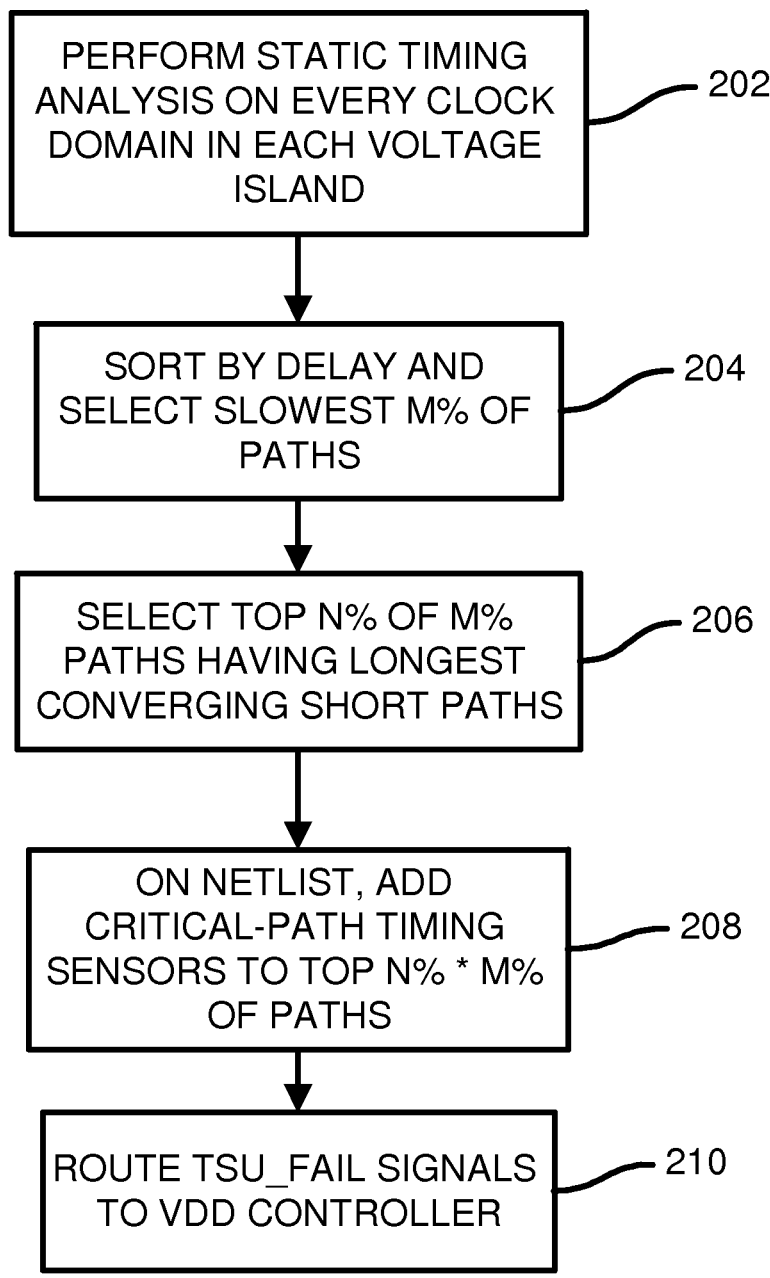
FIG. 14 is a flowchart of inserting critical path timing sensors and VDD controllers into a chip design.

Another problem is that the converging short path may be too fast. A critical path may have many converging paths. The shortest of these converging paths may have a very small delay, so that TSP is too small for CCLK to be generated in time. This short path problem can be avoided by adding gates or other delays when routing the short paths during place and route, or by not selecting critical paths that have too short of converging short paths, such as shown by the procedure of FIG. 14.

Figure 7:
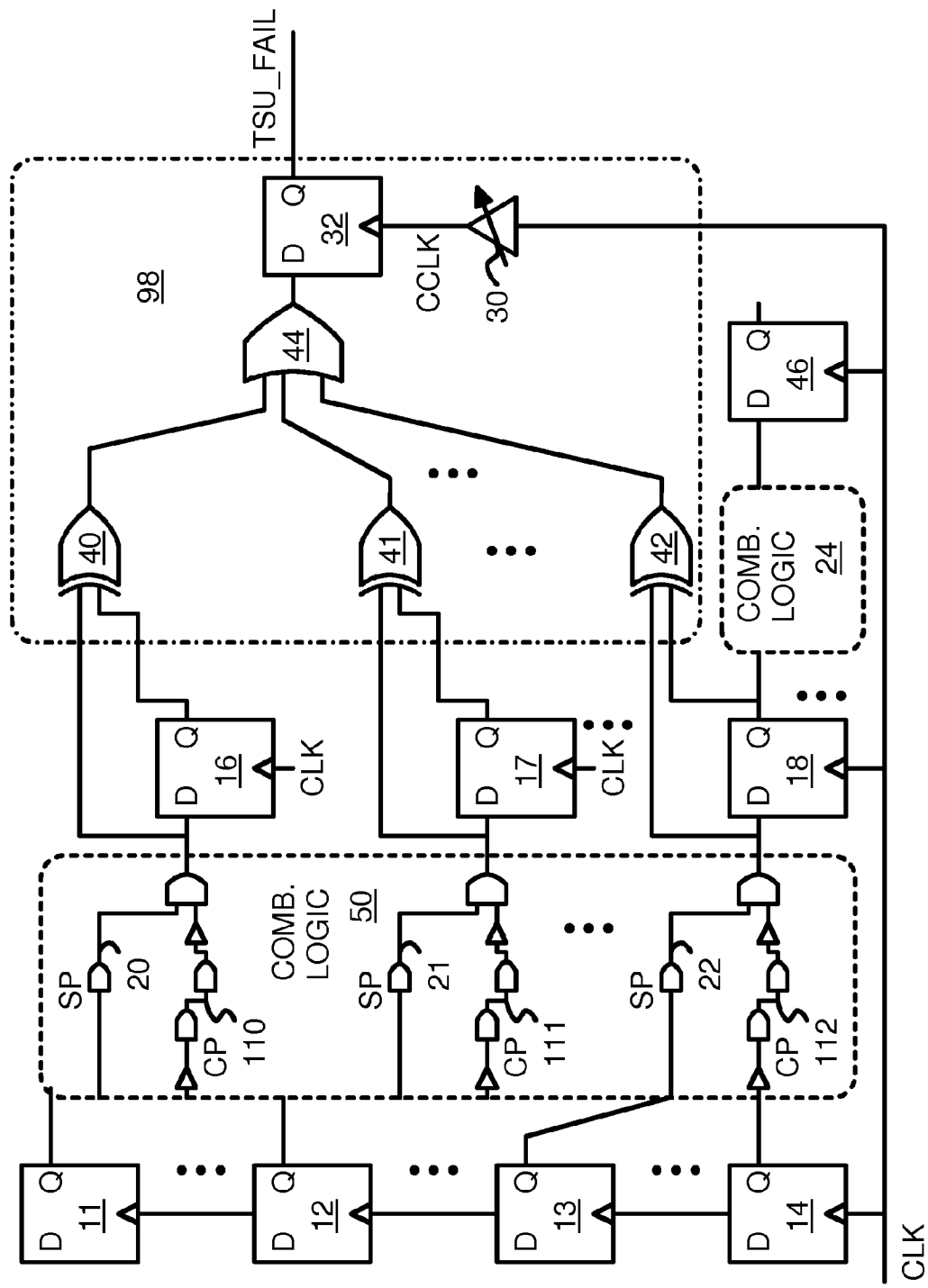
FIG. 7 shows several critical paths sharing a critical path sensor.

FIG. 7 shows several critical paths sharing a CP sensor. There are many functional critical paths 110, 111, 112 in combinatorial logic 50, each with a shortest converging short path 20, 21, 22. Many first-level flip-flops 11, 12, 13, 14 provide test data or normal data to combinatorial logic 50. Each functional critical path 110, 111, 112 drives the D input of a different next-level flip-flop 16, 17, 18.

The D and Q terminals of each of these next-level flip-flops 16, 17, 18 that are driven by a functional critical path are exclusive-OR'ed by XOR gates 40, 41, 42 to generate three timing failure signals. The outputs of XOR gates 40, 41, 42 are combined by OR gate 44 to generate a composite failure signal that is captured by capture flip-flop 32 when CCLK is generated by delay buffer 30. When any of functional critical paths 110, 111, . . . 112 fail the set up time, capture flip-flop 32 generates timing failure signal TSU_FAIL.

Critical path timing sensor 98 saves N−1 flip-flops compared with critical path timing sensor 120 of FIG. 5, where N is the number of critical paths that are sensed. Thus the required overhead for CP sensors is reduced.

Figure 8:
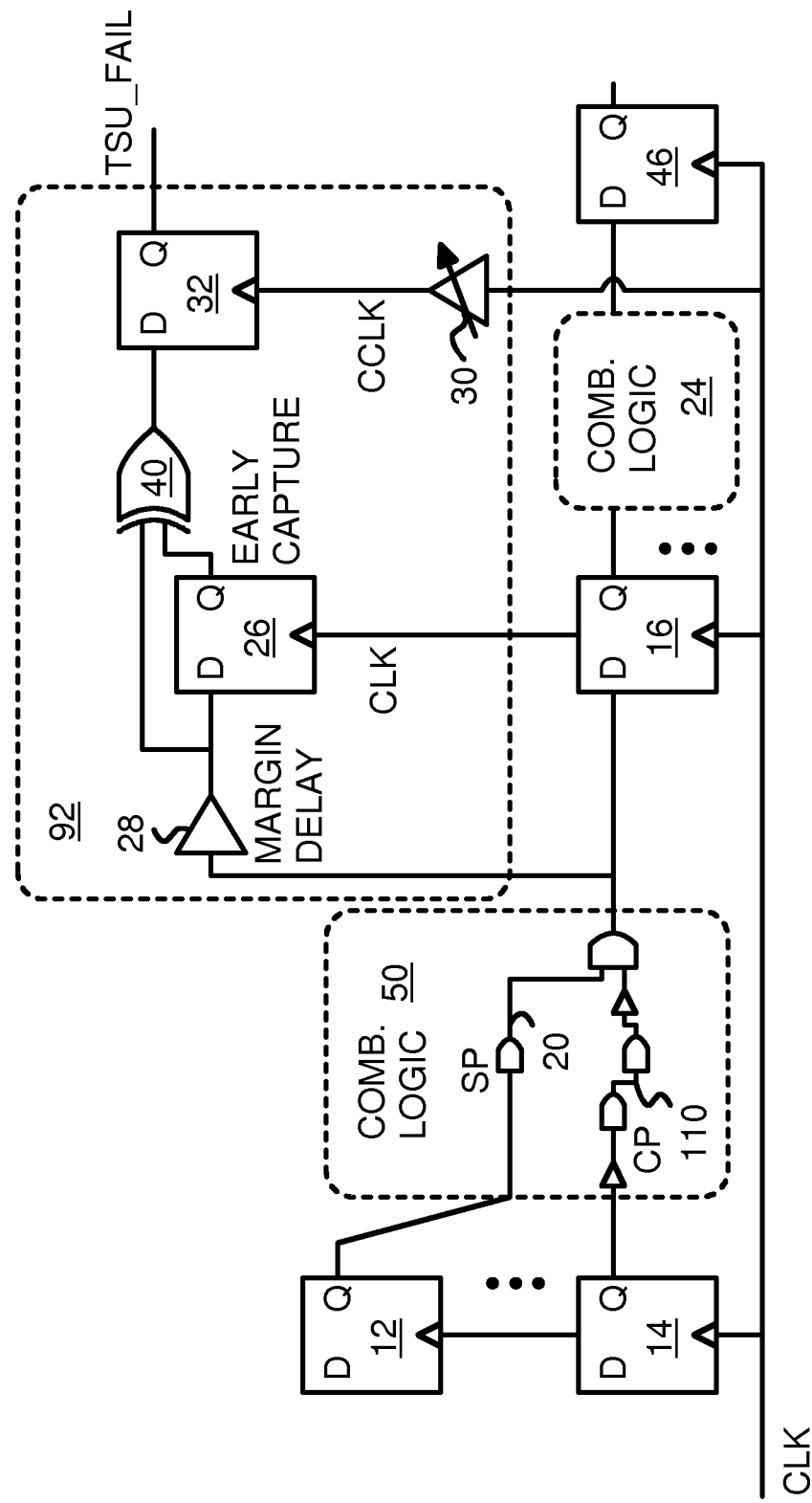
FIG. 8 shows a critical path sensor with a margin delay to detect failures before they occur.

FIG. 8 shows a critical path sensor with a margin delay to detect failures before they occur. The critical path sensors of FIGS. 6, 7 detect when a timing failure occurs in next-level flip-flop 16. It may be more desirable to detect failures before they occur. If the paths chosen for the critical path sensors are not really the most critical paths, a path without a critical path sensor may fail first, undetected.

A margin for such error may be added to the critical path sensors. Margin delay buffer 28 receives the D input to next-level flip-flop 16 and adds a margin delay before driving the D input of early capture flip-flop 26. Both next-level flip-flop 16 and early capture flip-flop 26 are clocked by the same CLK, but margin delay buffer 28 increases the effective required set-up time to early capture flip-flop 26. The test data through functional critical path 110 must arrive at least the margin delay of margin delay buffer 28 earlier to avoid a timing failure early capture flip-flop 26. As the delay through functional critical path 110, TCP, is slowly increased, early capture flip-flop 26 will capture a timing failure before next-level flip-flop 16 does. Thus the functional logic is not subjected to a failure that could disrupt operations later.

XOR gate 40 compares the D and Q terminals of early capture flip-flop 26 rather than of next-level flip-flop 16. Capture flip-flop 32 samples the failure signal from XOR gate 40 when CCLK is generated by delay buffer 30. Thus critical path timing sensor 92 captures an early timing failure before the functional path's flip-flop experiences a timing failure. Timing failures in the functional paths (next-level flip-flop 16) are predicted (FIG. 8) rather than detected (FIG. 6) while still using the actual functional critical paths (110) for combinatorial logic. The differences in electrical characteristics between next-level flip-flop 16 and early capture flip-flop 26 are less important since margin delay buffer 28 adds a delay that is likely larger than any differences between flip-flops 16, 26.

Figure 9:
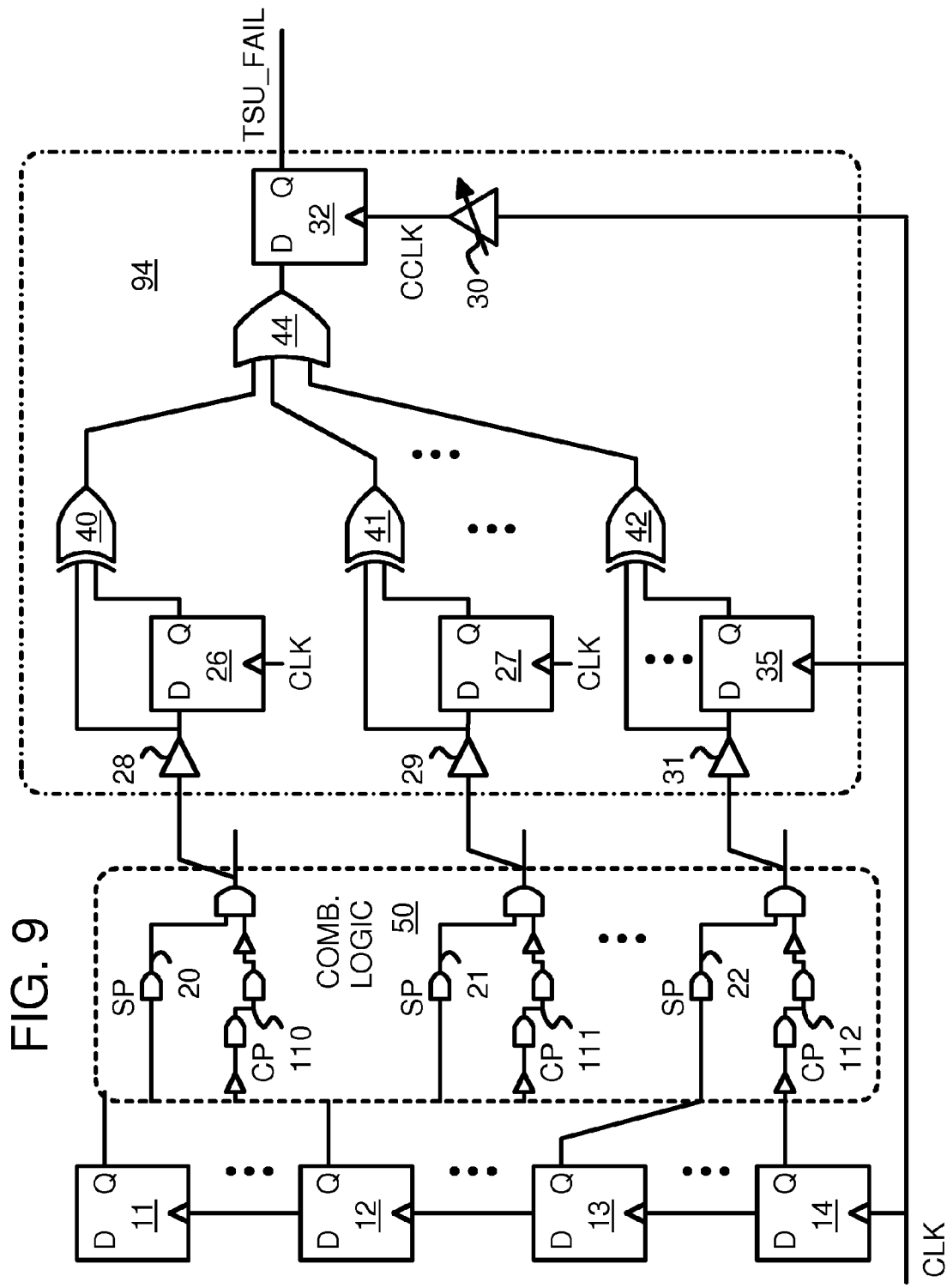
FIG. 9 is a diagram of a shared critical path margin sensor.

FIG. 9 is a diagram of a shared critical path margin sensor. Critical path timing sensor 92 of FIG. 8 requires two flip-flops per critical path sensed. This overhead can be reduced by N−1 flip-flops by sharing capture flip-flop 32 of FIG. 8.

Next-level flip-flops 16 still receive the outputs of functional critical paths 110, 111, 112 as shown in FIG. 7, but are not shown in FIG. 9. The outputs of these critical paths 110, 111, 112 are also applied to margin delay buffers 28, 29, 31 to delay the inputs to early capture flip-flops 26, 27, 35.

The D and Q terminals of each of these early capture flip-flops 26, 27, 35 that are driven by a functional critical path delayed by margin delay buffers 28, 29, 31 are exclusive-OR'ed by XOR gates 40, 41, 42 to generate three timing failure signals. The outputs of XOR gates 40, 41, 42 are combined by OR gate 44 to generate a composite failure signal that is captured by capture flip-flop 32 when CCLK is generated by delay buffer 30. When any of functional critical paths 110, 111, ... 112 fail the set up time, capture flip-flop 32 generates timing failure signal TSU_FAIL.

Critical path timing sensor 94 saves N−1 flip-flops compared with critical path timing sensor 92 of FIG. 8, where N is the number of critical paths that are sensed. Thus the required overhead for critical path margin sensors is reduced.

Figure 10:
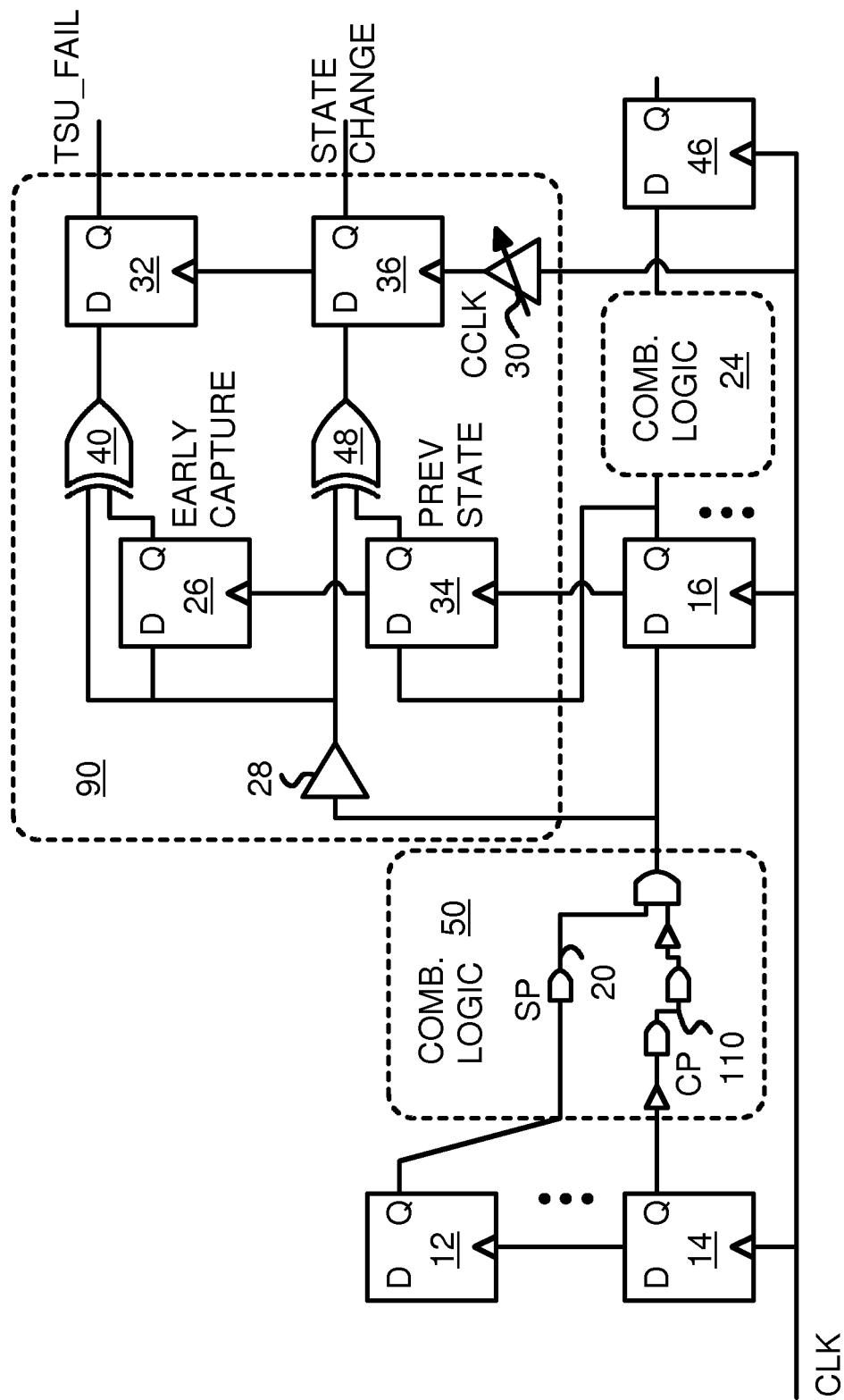
FIG. 10 shows a critical path timing sensor that also detects state changes.

FIG. 10 shows a critical path timing sensor that also detects state changes. A set-up timing failure should only be valid when a state change occurs in next-level flip-flop 16. When both the current and next states of next-level flip-flop 16 are identical, then any timing failure signal should be disregarded.

Critical path timing sensor 90 operates as described earlier for critical path timing sensor 92 of FIG. 8. The previous state is sampled from the Q output of next-level flip-flop 16 by the D input of previous state flip-flop 34. XOR gate 48 compares the previous state output by previous state flip-flop 34 with the current state delayed by margin delay buffer 28. A high from XOR gate 48 indicates a state change, and is captured by state capture flip-flop 36. Controller 130 (FIG. 3) can disregard TSU_FAIL from capture flip-flop 32 when STATE_CHANGE from state capture flip-flop 36 is low, indicating that no valid state change occurred.

Figure 11:
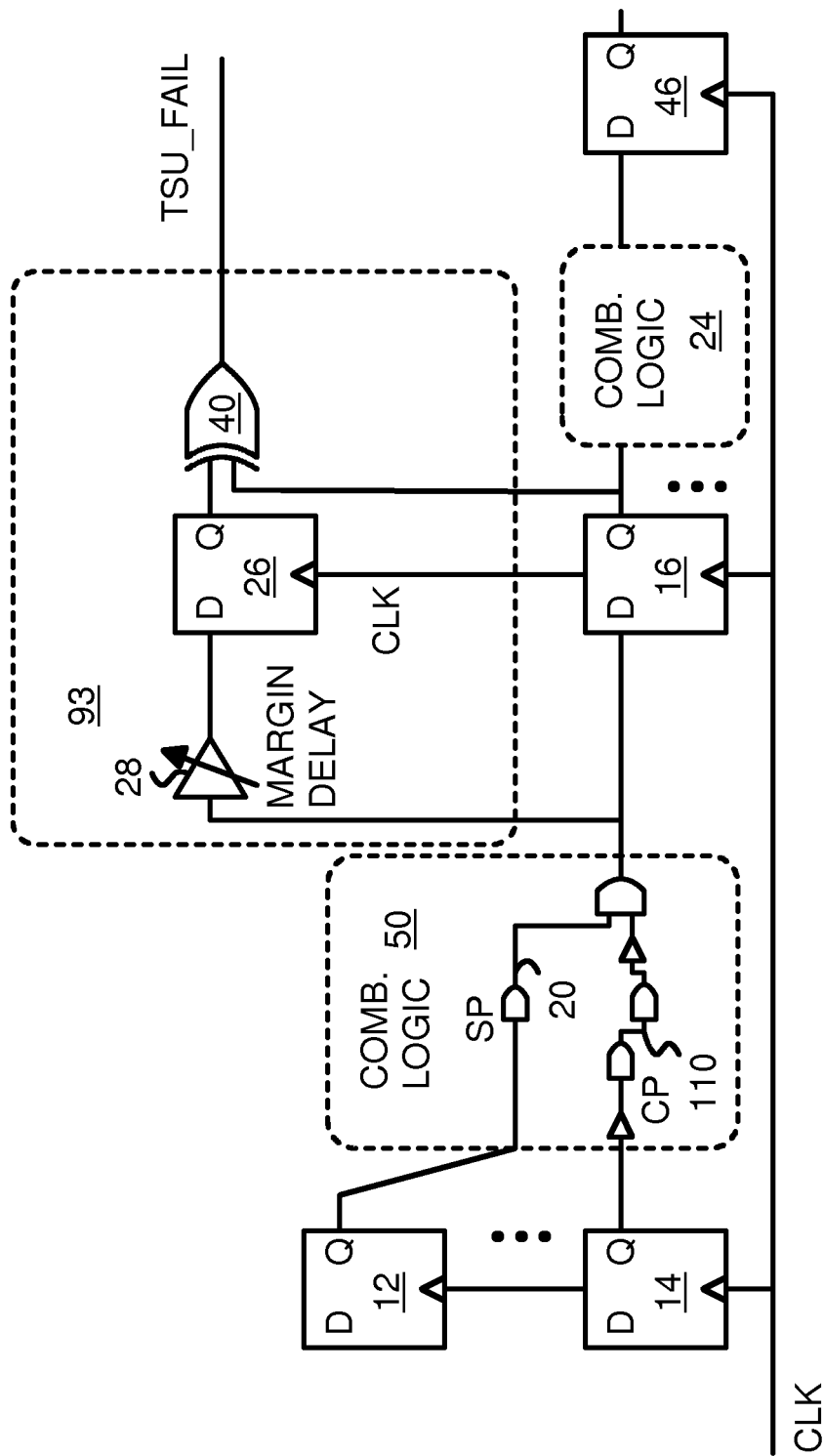
FIG. 11 has a critical path margin sensor without a capture clock.

FIG. 11 has a critical path margin sensor without a capture clock. Capture flip-flop 32 and delay buffer 30 to generate CCLK from critical path timing sensor 92 of FIG. 8 are deleted.

Rather than compare the D and Q terminals of early capture flip-flop 26, XOR gate 40 compares the Q outputs of early capture flip-flop 26 and next-level flip-flop 16. The extra delay from margin delay buffer 28 may cause early capture flip-flop 26 to fail when next-level flip-flop 16 does not fail. Since XOR gate 40 is comparing Q outputs that are both clocked by the same clock CLK, rather than the D input, a timing window is not needed, and CCLK does not need to be generated. Thus critical path timing sensor 93 is simplified. The delay generated by margin delay buffer 28 may be variable.

Figure 12:
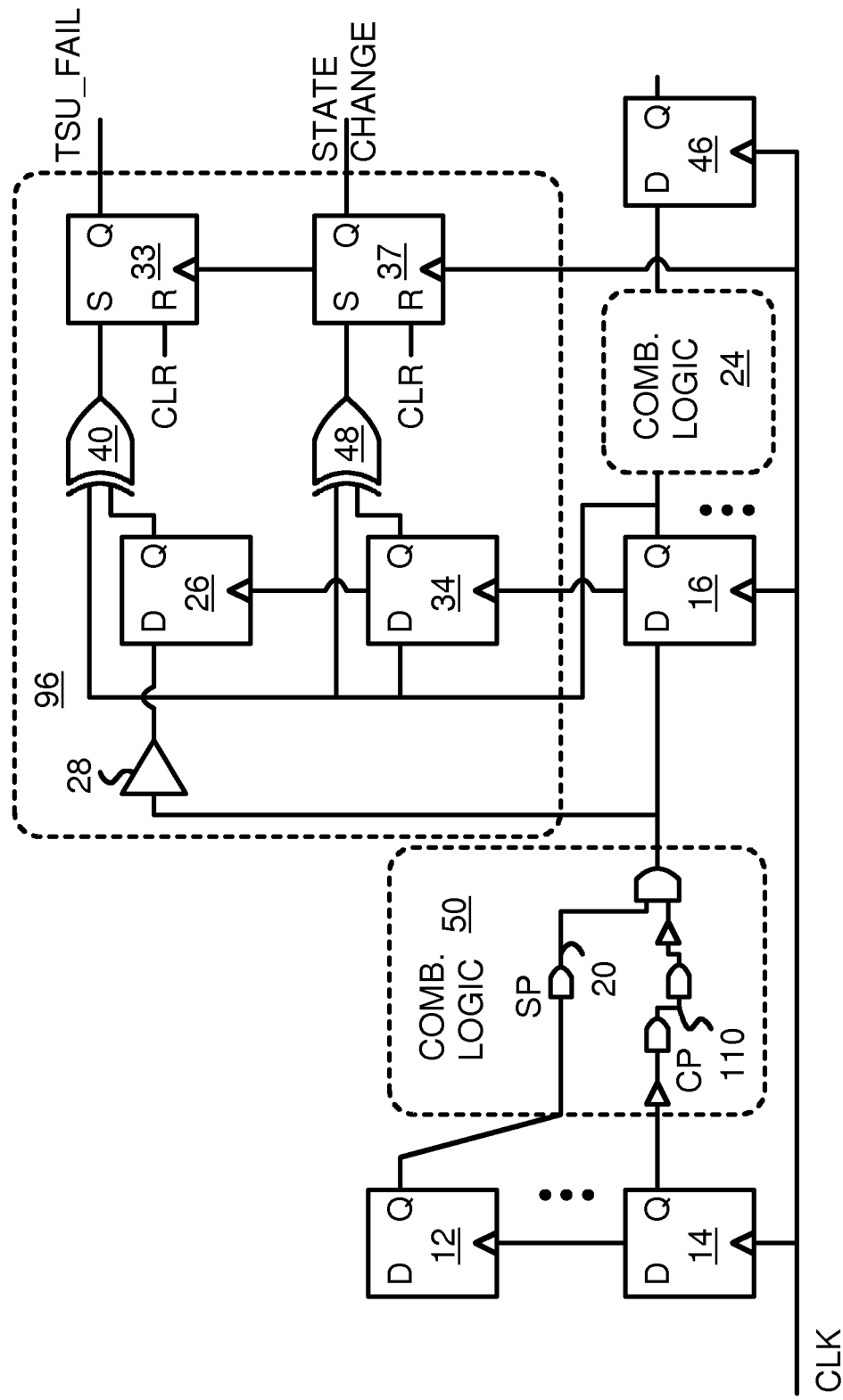
FIG. 12 is a schematic of adding accumulators and state change detection to the critical path timing sensor of FIG. 11.

FIG. 12 is a schematic of adding accumulators and state change detection to the critical path timing sensor of FIG. 11. XOR gate 40 compares the Q outputs of early capture flip-flop 26 and of next-level flip-flop 16 to generate a timing failure signal that sets accumulator 33.

The previous state is sampled from the Q output of next-level flip-flop 16 by the D input of previous state flip-flop 34. XOR gate 48 compares the D and Q terminals of previous state flip-flop 34. A high from XOR gate 48 indicates a state change, and sets accumulator 37 when CLK goes high.

Accumulators 33, 37 are 1-bit saturating counters that are clocked by CLK and cleared by controller 130 asserting CLR to reset input R. Critical path timing sensor 96 accumulates timing failures that can be examined by controller 130 at a later time, possibly reducing the workload of controller 130. Controller 130 can periodically check the values in accumulators 33, 37 and then adjust VDD upward when both accumulators are high, indicating that a valid state change occurred when a timing failure occurred. When accumulator 37 is high, indicating a state change, but accumulator 33 is low, indicating no timing failure has occurred, VDD can be lowered. When the accumulators are still cleared when controller 130 checks them after some period of time, indicating that no valid timing error occurred, then controller 130 can decrease VDD by another increment. Controller 130 executes a control loop to adjust VDD and then check for timing errors. Controller 130 could perform this control loop and VDD adjustment only during a test mode, or during normal operation. Making VDD adjustments during a test mode could allow for speed-grading parts during manufacture. The final VDD may be set during testing. In another embodiment, VDD is adjusted during normal operation. This permits adaptive adjustment in the field to compensate for temperature variation or device aging. Adaptive in-the-field adjustment may use voltage regulators, feedback loops and controllers that are not needed with the embodiment that tests and adjusts VDD only during manufacturing test.

Figure 13:
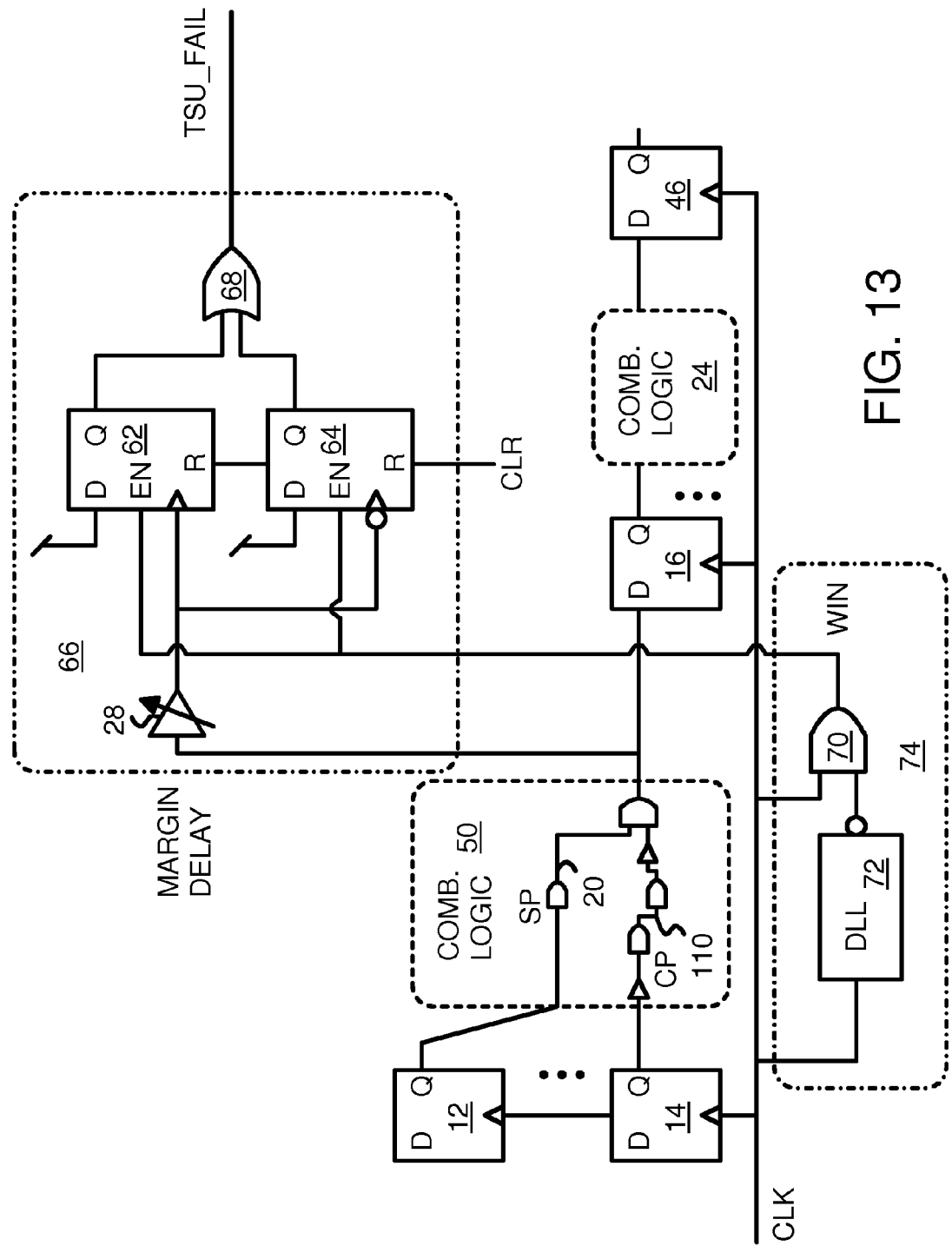
FIG. 13 shows an edge-triggered critical path timing sensor.

FIG. 13 shows an edge-triggered critical path timing sensor. Critical path timing sensor 66 activates timing failure signal TSU_FAIL when either a rising edge is captured by flip-flop 62 or a falling edge is captured by flip-flop 64. OR gate 68 combined the captured rising and falling edges to generate TSU_FAIL.

The output of functional critical path 110 is applied to the D input of next-level flip-flop 16 and also is delayed by margin delay buffer 28 and applied to the clock input of flip-flop 62. A rising edge from functional critical path 110 causes the high from the D input of flip-flop 62 to be clocked to the Q output when enable EN is high.

The signal from margin delay buffer 28 is inverted and applied to the clock input of flip-flop 64. A falling edge from functional critical path 110 causes the high from the D input of flip-flop 64 to be clocked to the Q output when enable EN is high.

Thus when enable EN is high, flip-flop 62 captures any rising edges while flip-flop 64 captures any falling edges from functional critical path 110. These edges can occur any time during a timing window WIN that drives the enable EN inputs. Flip-flops 62, 64 are cleared by controller 130 asserting CLR to reset inputs R. This embodiment has the advantage of capturing any edges or transitions that occur during a window of time, rather than at a single specific point in time.

Timing window generator 74 generates timing window signal WIN that is applied to the enable EN inputs of flip-flops 62, 64. Delay-Locked Loop (DLL) 72 delays CLK by a programmable amount of time. The output of DLL 72 is inverted and applied to AND gate 70 to generate WIN. AND gate 70 also receives CLK. When CLK goes from low to high, both inputs to AND gate 70 are initially high, driving WIN high and enabling flip-flops 62, 64 to capture any transitions from functional critical path 110 after the margin delay from margin delay buffer 28. The timing window ends after the delay from DLL 72. Thus DLL 72 sets the width of the timing window.

FIG. 14 is a flowchart of inserting critical path timing sensors and VDD controllers into a chip design. The chip or system can be designed normally, producing a Register-Transfer level (RTL) file, net list or other computer-readable net list or description of the logic in the chip. Static timing analysis is performed on the design, step 202. Each clock domain and each voltage island (domain) can be processed separately. The static timing analysis produces delays for each path in combinatorial logic between flip-flops. These generated delays are sorted to find the longest delays, and the M % of paths with the longest delays are selected, step 204. These M % of paths are the slowest and most likely to have a timing failure.

The converging paths for each path in the M % of paths selected are then analyzed, step 206. There may be several converging paths for each path identified in step 204. Converging paths with very short delays are undesirable since their TSP is too small. The window of time to sample the D and Q terminals of next-level flip-flop 16 is too short when TSP is too short (FIG. 6). Larger TSP values are preferred.

The M % of paths are analyzed and paths having the shortest converging paths are discarded. Out of the longest M % of paths selected in step 204, those with the slowest short paths are selected in step 206. This ensures that TSP is large enough for the critical path sensors to operate effectively. N % of the M % of paths are chosen in step 206. These are the selected critical paths that can operate effectively with the CP sensors.

Additional hardware for the critical path sensors may include XOR gates 40, early capture flip-flops 26, margin delay buffers 28, etc., depending on which variation of critical path timing sensors are added (FIGS. 5, 7-13 and variations or combinations). Design software adds these gates, flip-flops, etc. to the RTL, net list, or other design description file, step 208 to the N %*M % of critical paths identified in step 206. These added components are connected to the outputs of the identified functional critical paths, and the failure signals TSU_FAIL are routed from the sensors to VDD controller 130, which is also added to the design net list, step 210. VDD controller 130 and other components are connected together and to control VDD, such as shown in FIG. 3. Design synthesis software may be used to convert RTL into the actual gates and wires that are placed and routed by layout software to generate the manufacturing mask images to print the chip design onto the various layers of materials during the manufacturing process.

Alternate Embodiments

Several other embodiments are contemplated by the inventors. For example many kinds and arrangements of logic gates are possible, including NAND, NOR, AND, OR, XOR, NXOR, etc. While a rising edge CLK has been described, flip-flops that use the falling edge of CLK or of another clock may be used. Multiple clocks may be used. While XOR gates have been shown, exclusive-NOR (XNOR) gates could be substituted with inverted output signals.

The change-of-state signal generated by XOR gate 48 could be AND'ed with the timing failure signal from XOR gate 40 and the AND result latched into a flip-flop that generates a validated TSU_FAIL signal. In FIG. 12, an AND gate combining the outputs of XOR gates 40, 48 could drive the D-input of accumulator 33, eliminating the need for accumulator 37. Likewise in FIG. 10, an added AND gate combining the outputs of XOR gates 40, 48 could drive the D-input of capture flip-flop 32, eliminating the need for state capture flip-flop 36.

A chip could have several voltage islands or domains. One domain could be powered with one VDD voltage, while another domain could be powered with a different VDD voltage. Separate voltage domains could be used for memory arrays, logic, processors, analog circuits, and I/O. Each voltage domain could have its own functional critical paths, sensors, and VDD controller.

In FIG. 4B, a timing hazard occurs since the data clocked into the next-stage flip-flop is not guaranteed to be correct. The flip-flop could become meta-stable or unstable if the D input was at an intermediate voltage level rather than high or low, and this instability could resolve itself at some unknown time in the future. Having only one critical path sensor could be dangerous if such instability were to occur. However, having several critical paths that are sensed at the same time can reduce this danger, since each critical path has a slightly different delay.

A LSSD scan chain may include all of first-level flip-flops 12, 14, next-level flip-flop 16, and third-level flip-flop 46 (FIG. 5, etc.). The levels are arbitrary since logic signals can wrap backwards among any of the flip-flops. Combinatorial logic 50 and combinatorial logic 24 may be part of the same logic block and are shown separately as a teaching aid rather than as a real circuit division. While flip-flops 12, 14, 16, 46 have been shown using the same clock CLK, latches could be substituted. CLK could be replaced by two-phase non-overlapping clocks, with combinatorial logic between each phase latch. Registers that store state could be designed in RTL and implemented as D-type flip-flops, testable or scan-chain D-type flip-flops, muxed-input or flip-flops with a second test clock, toggle flip-flops, J-K flip-flops, transparent latches, S-R latches, and various combinations.

While measuring the delay of functional critical path 110 has been described as occurring during a test mode when functional data is paused, timing delays could also be measured during normal operation when the test mode is not active. This is especially true when margin delay buffer 28 is present, since early capture flip-flop 26 in the timing sensor will fail before next-level flip-flop 16 in the functional data path. Test mode may be necessary to ensure that state transitions occur since normal functional data may not toggle next-level flip-flop 16 for long periods of time, depending on the functions being performed. Having many functional critical paths 110, 111, . . . 112 can improve controller 130 accuracy since more paths are checked for timing. In FIG. 14, the circuit behavior may also be used to select which paths to use as sensed critical paths. For example, paths that change data frequently, toggling next-level flip-flop 16, may be selected over static paths that have relatively few state changes.

In FIG. 10, previous state flip-flop 34 is clocked by CLK while state capture flip-flop 36 is clocked by CCLK. It may also be possible to clock state capture flip-flop 36 with CLK (Such as for FIG. 12). Previous state flip-flop 34 and state capture flip-flop 36 could be added to critical path timing sensors 120 of FIG. 5 as another alternative. Other combinations are also possible. Accumulators 33, 37 (FIG. 12) may be added to other critical path timing sensors. The second accumulator 37 for state change may be deleted in some embodiments. Other kinds of accumulators, S-R latches, or flag registers may be substituted. In particular, accumulator 33 could be a multi-bit accumulator that counts a number of validated timing failures that have occurred since the accumulator was last cleared. Controller 130 may use the count value to determine how large of a change to make to VDD.

The delay generated by margin delay buffer 28 may be variable, as can the CCLK phase delay generated by delay buffer 30 or by DLL 72 in timing window generator 74. A metal mask option may be used to set these delays, or the delay may be set during design after careful statistical or other analysis. These delays may have both a fixed delay component and a programmable delay component. The programmable delays may be controlled by controller 130. Controller 130 may sweep these delays across a range of increments. Controller 130 may adjust the margin delay, VDD, and the clock frequency using a closed control loop. A Delay-Locked Loop (DLL) may be used, muxes or switches to bypass a variable number of delay buffers, to add capacitance or resistance delays, or other programmable methods to allow controller 130 to set margin delay buffer 28, CCLK delay buffer 30, or the window width from timing window generator 74. The increment for the delay adjustment may be larger than the corresponding VDD increment. Controller 130 may use VDD adjustment as a finer control and margin delay adjustment as a coarse control. Ideally, the margin delay is large enough to accommodate any expected jumps in VDD due to adjustments to IVR 136 or PMIC 138.

When VDD is set too high, transistor speed may be so high that the delay through margin delay buffer 28 may be too small to distinguish between next-level flip-flop 16 and early capture flip-flop 26.

Controller 130 could use an initial nominal VDD value and then increase VDD when no failures are detected for several cycles. VDD may be decreased when a failure occurs for a valid state change. Once a maximum or minimum VDD is reached, no further VDD changes are allowed. In some embodiments, the clock frequency then might be changed, such as by adjusting a Phase-Locked Loop (PLL) of other clock generator. VDD could be increased by larger increments than by the decrement increment, and the size of the increment could be a function of the number of timing failures detected.

DLL 72 (FIG. 13) could be replaced with one or more inverters so that timing window generator 74 is a pulse generator. The input to DLL 72 or a substituted pulse generator could be taken from an earlier stage in a clock tree that generates CLK, so that timing window WIN has a negative clock skew or phase. Then margin delay buffer 28 could be eliminated. A DLL could also be used to generate a negative clock skew rather than a positive clock skew.

Flip-flops 62, 64 of FIG. 13 could be replaced by latches. An AND gate pulse generator could have the D input of next-level flip-flop 16 as a third input, and drive one latch with a true output and the other latch with an inverted output to mimic the rising and falling edge capture of flip-flops 62, 64. Change-of-state flip-flops could also be added to the circuit of FIG. 13 and its variations.

Controller 130 adjusts VDD to account for process skews, allowing fast-process chips to operate at higher performance or lower power than if spec'ed for all process corners. The process skew is detected by adjusting VDD which adjusts the delay through the critical paths TCP until timing failures occur, either in the data path in next-level flip-flop 16 or in the sensor in early capture flip-flop 26 when margin delay buffer 28 adds a timing margin.

Controller 130 also accounts for changes in temperature, aging or wear of the circuit, voltage drops, or other phenomena. Whatever causes speed changes in the circuit is accounted for by measuring the actual timing delays of functional critical paths compared with set-up timing requirements to flip-flops, either with or without added timing margin.

Rather than use internal controller 130, external software or an external tester could read the results from the critical path timing sensors, such as by reading TSU_FAIL signals stored in an on-chip register. The external software or tester could then write a new value for VDD to VDD register 132 to adjust VDD (FIG. 3). Other combinations of internal and external control are possible.

Extra components could be added to the short paths during design synthesis to increase the width of the timing window, making the sensor design more robust. A transparent latch that prevents the short path's output form changing during the first half of the clock period could be added. This latch would increase TSP to half of a clock period. Extra components could be added to functional critical path 110 to increase its delay for extra margin. There are limits to VDD variation, so controller 130 may adjust VDD within these limits.

The top 5% or 10% of paths may be chosen as M %, and N % can be 10%, so that N % of M % of paths are 0.5% to 1% of the paths. Other values may be substituted for M and N. Software, firmware, hardware, and various combinations may be used for sorting and selecting critical paths and for controller 130 and other components.

Some embodiments may not use all components. For example, registers, gates, switches, etc. may be added or deleted in some embodiments. Inversions may be added by swapping inverting and non-inverting inputs as desired, but do not change the overall function and thus may be considered equivalents. Clocks may be inverted. Active-low clocks could be used that have non-overlapping low-going pulses rather than non-overlapping high-going pulses.

Capacitors, resistors, and other filter elements may be added. Gates could employ n-channel transistors, p-channel transistors, or transmission gates with parallel n-channel and p-channel transistors, or more complex circuits, either passive or active, amplifying or non-amplifying.

Additional components may be added at various nodes, such as resistors, capacitors, inductors, transistors, extra buffering, etc., and parasitic components may also be present. Enabling and disabling the circuit could be accomplished with additional transistors or in other ways. Pass-gate transistors or transmission gates could be added for isolation.

The background of the invention section may contain background information about the problem or environment of the invention rather than describe prior art by others. Thus inclusion of material in the background section is not an admission of prior art by the Applicant.

Any methods or processes described herein are machine-implemented or computer-implemented and are intended to be performed by machine, computer, or other device and are not intended to be performed solely by humans without such machine assistance. Tangible results generated may include reports or other machine-generated displays on display devices such as computer monitors, projection devices, audio-generating devices, and related media devices, and may include hardcopy printouts that are also machine-generated. Computer control of other machines is another tangible result.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A process-sensing integrated circuit sensor comprising:
a plurality of registers for storing internal signals in response to a clock;
combinatorial logic between inputs and outputs of the plurality of registers, the combinatorial logic defining a plurality of critical paths;
wherein the plurality of critical paths carry real data and control information during normal modes of operation rather than being dummy paths having no functional use; and
a timing sensor for each critical path in the plurality of critical paths, each critical path driving a next-level input to a next-level register in the plurality of registers, the next-level register producing a next-level output in response to the next-level input and a clock, each timing sensor comprising a margin delay buffer receiving the next-level input and driving a delayed input delayed by a margin time, an early capture register that produces a delayed output in response to the delayed input and the clock, and a comparison circuit that produces a timing failure signal responsive to the delayed output and one of the delayed input and the next-level output, wherein the timing sensor generates a timing failure signal when data passing through a critical path arrives at the next-level input after a trigger time;
wherein the trigger time is the margin time plus a set-up time for the next-level input relative to the clock to the next-level register;
wherein the timing failure signal is generated by sensing a delay through the critical path relative to the trigger time for the next-level register using actual components of the critical path under current process, temperature, and voltage conditions.

2. The process-sensing integrated circuit sensor of claim 1 wherein each timing sensor comprises:
a compare gate that compares the delayed output to the next-level output of the next-level register and activates the timing failure signal when the delayed output does not match the next-level output.

3. The process-sensing integrated circuit sensor of claim 2 wherein each timing sensor further comprises:
a previous state register that receives the next-level output and generates a previous state signal in response to the clock; and
a previous-state compare gate that compares the next-level output to the previous state signal and enables the timing failure signal from the compare gate when the previous state signal does not match the next-level output,
whereby timing failures are enabled only when state change occurs.

4. The process-sensing integrated circuit sensor of claim 1 wherein each timing sensor comprises:
a compare gate that compares the delayed output to the delayed input and signals a timing detect when the delayed output does not match the delayed input;
a capture delay buffer that receives the clock and generates a capture clock having a capture delay from the clock; and
a capture register that receives the timing detect from the compare gate and generates the timing failure signal in response to the capture clock.

5. The process-sensing integrated circuit sensor of claim 1 wherein each timing sensor comprises:
a timing window generator that receives the clock and generates a window enable signal during a window of time after the next-level register is clocked;
a rising-edge capture register that is clocked by the delayed input when enabled by the window enable signal to generate a captured rising edge signal;
a falling-edge capture register that is clocked by an inverse of the delayed input when enabled by the window enable signal to generate a captured falling edge signal; and
a combining gate that generates the timing failure signal when either the captured rising edge signal or the captured falling edge signal has been activated,
whereby rising and falling edges from the critical path are captured during the window of time.

6. The process-sensing integrated circuit sensor of claim 5 wherein the timing window generator comprises:
an AND gate that receives the clock and generates the window enable signal; and
a delay inverter that receives the clock and drives a second input to the AND gate.

7. The process-sensing integrated circuit sensor of claim 5 wherein the timing window generator comprises:
- an AND gate that receives the clock and generates the window enable signal;
- a Delay-Locked Loop (DLL) that receives the clock and generates a DDL output; and
- an inverter that inverts the DLL output to drives a second input to the AND gate.

8. A critical-path sensing Integrated Circuit (IC) comprising:
- a plurality of registers that store state;
- combinatorial logic between outputs of the registers and inputs of the registers;
- a first next-level register in the plurality of registers, the first next-level register having a first input and a first output;
- a first critical path in the combinatorial logic, the first critical path having a first critical path delay from a first register in the plurality of registers to a first input to the first next-level register;
- a first short path in the combinatorial logic, the first short path converging with the first critical path, wherein the first short path has a first short path delay that is a smaller delay to the first input than other converging paths that converge with the first critical path;
- wherein the first critical path and the first short path carry data or control information during normal operation of the critical-path sensing IC, wherein the first critical path is a functional critical path not a dummy critical path;
- a critical path timing sensor that activates a timing failure signal when a set-up timing of the first critical path to the first input of the first next-level register is violated, each critical path timing sensor comprising a margin delay buffer receiving the first input and driving a delayed input delayed by a margin time, an early capture register that produces a delayed output in response to the delayed input and a clock, and a comparison circuit that produces a timing failure signal responsive to the delayed output and one of the delayed input and the first output; and
- a controller that receives the timing failure signal from the critical path timing sensor, the controller causing a power-supply voltage to the plurality of registers and to the combinatorial logic to be increased when the timing failure signal is received, the controller causing the power-supply voltage to be reduced when no timing failure signal is received for a period of time,
- wherein the power-supply voltage is adjusted to compensate for timing failures detected through the first critical path.

9. The critical-path sensing IC of claim 8 further comprising:
- a second next-level register in the plurality of registers, the second next-level register having a second input and a second output;
- a second critical path in the combinatorial logic, the second critical path having a second critical path delay from a second register in the plurality of registers to a second input to the second next-level register;
- a second short path in the combinatorial logic, the second short path converging with the second critical path, wherein the second short path has a second short path delay that is a smaller delay to the second input than other converging paths that converge with the second critical path;
- a third next-level register in the plurality of registers, the third next-level register having a third input and a third output;
- a third critical path in the combinatorial logic, the third critical path having a third critical path delay from a third register in the plurality of registers to a third input to the third next-level register; and
- a third short path in the combinatorial logic, the third short path converging with the third critical path, wherein the third short path has a third short path delay that is a smaller delay to the third input than other converging paths that converge with the third critical path;
- wherein the second critical path and the third critical path carry data or control information during normal operation of the critical-path sensing IC, wherein the second and third critical paths are functional critical paths not dummy critical paths;
- wherein the critical path timing sensor also activates the timing failure signal when a set-up timing of the second critical path to the second input of the second next-level register is violated, and also activates the timing failure signal when a set-up timing of the third critical path to the third input of the third next-level register is violated;
- wherein multiple critical paths are sensed for timing failures to adjust the power-supply voltage for compensation.

10. The critical-path sensing IC of claim 9 wherein the critical path timing sensor comprises:
- a first compare gate that compares the first input and the first output of the first next-level register;
- a second compare gate that compares the second input and the second output of the second next-level register;
- a third compare gate that compares the third input and the third output of the third next-level register;
- a clock delay buffer that delays a clock to the first next-level register by a capture delay to generate a capture clock;
- a first capture register, clocked by the capture clock, to activate the timing failure signal to the controller when the first compare gate detects that the first input and first output do not match;
- wherein a mismatch of the first input and first output of the first next-level register is detected after the capture delay after the first next-level register was clocked;
- a second capture register, clocked by the capture clock, to activate the timing failure signal to the controller when the second compare gate detects that the second input and second output do not match;
- wherein a mismatch of the second input and second output of the second next-level register is detected after the capture delay after the second next-level register was clocked; and
- a third capture register, clocked by the capture clock, to activate the timing failure signal to the controller when the third compare gate detects that the third input and third output do not match;
- wherein a mismatch of the third input and third output of the third next-level register is detected after the capture delay after the third next-level register was clocked.

11. The critical-path sensing IC of claim 10 wherein the first short path delay, the second short path delay, and the third short path delay are each longer than the capture delay,
- wherein the first input, second input, and third input do not change until after the capture delay so that a timing failure can be detected when inputs are stable.

12. The critical-path sensing IC of claim 9 wherein the critical path timing sensor comprises:
- a first compare gate that compares the first input and the first output of the first next-level register;
- a second compare gate that compares the second input and the second output of the second next-level register;
- a third compare gate that compares the third input and the third output of the third next-level register;
- a clock delay buffer that delays a clock to the first next-level register by a capture delay to generate a capture clock;
- a combining gate that combines outputs from the first compare gate, the second compare gate, and the third compare gate to generate a combined output; and
- a combined capture register, clocked by the capture clock and receiving the combined output, to activate the timing failure signal to the controller when the combined output indicates that the first input and first output do not match, or that the second input and second output do not match, or that the third input and third output do not match;
- wherein a mismatch is detected and latched after the capture delay after the first, second, and third next-level registers were clocked.

13. The critical-path sensing IC of claim 9 wherein the critical path timing sensor comprises:
- a first early capture register clocked when the first next-level register is clocked, generating a first delayed output; and
- a first compare gate that compares the first delayed input with the first delayed output to generate the timing failure signal;
- wherein the timing failure signal is generated when the first critical path delay plus the margin time violates a set-up timing requirement, which occurs before a failure occurs in the first next-level register,
- whereby timing failures are detected early to add a timing margin to protect operation of the first next-level register.

14. The critical-path sensing IC of claim 9 wherein the critical path timing sensor comprises:
- a window timing generator that generates a window enable signal during a window of time after the first next-level register is clocked;
- a rising-edge capture register that is clocked by the first delayed input when enabled by the window enable signal to generate a captured rising edge signal;
- a falling-edge capture register that is clocked by an inverse of the first delayed input when enabled by the window enable signal to generate a captured falling edge signal; and
- a combining gate that generates the timing failure signal to the controller when either the captured rising edge signal or the captured falling edge signal has been activated, whereby rising and falling edges of the first input from the first critical path are captured during the window of time.

15. The critical-path sensing IC of claim 14 wherein the window timing generator comprises a pulse generator having a combining gate that combines a clock and a delayed clock, and a buffer or a Delay-Locked Loop (DLL) to generate the delayed clock.

16. The critical-path sensing IC of claim 14 further comprising:
- a previous state register that receives the first output and generates a previous state signal;
- a previous state combining gate that compares the previous state signal from the previous state register with the first output from the first next-level register to indicate a stage change;
- wherein the timing failure signal is qualified with the state change wherein timing failures that occur when state change does not occur are invalidated.

17. The critical-path sensing IC of claim 16 further comprising:
- an accumulator that increments a count for each validated timing failure signal.

18. A process-correcting integrated circuit comprising:
- a plurality of register means for storing internal signals in response to a clock;
- combinatorial logic means, between inputs and outputs of the plurality of register means, for logically combining signals from the plurality of register means, the combinatorial logic means defining a plurality of critical paths;
- wherein the plurality of critical paths carry real data and control information during normal modes of operation;
- a plurality of next-level register means in the plurality of register means, each next-level register means for generating a first output and having a first input;
- critical path timing sensor means, coupled to each critical path in the plurality of critical paths, for activating a timing failure signal when a set-up timing of a critical path to the first input of the next-level register means is violated, each critical path timing sensor means comprising a margin delay buffer means for receiving the first input and driving a delayed input delayed by a margin time, early capture register means for generating a delayed output from the delayed input, and comparison circuit means for producing a timing failure signal responsive to the delayed output and one of the first output and the delayed input; and
- controller means, receiving the timing failure signal from the critical path timing sensor means, for causing a power-supply voltage to the plurality of register means and to the combinatorial logic means to be increased when the timing failure signal is received, and for causing the power-supply voltage to be reduced when no timing failure signal is received for a period of time,
- wherein the power-supply voltage is adjusted to compensate for timing failures detected through the critical paths.

* * * * *